United States Patent
Suparman et al.

(10) Patent No.: US 10,024,212 B2
(45) Date of Patent: Jul. 17, 2018

(54) WORK VEHICLE

(71) Applicant: KOMATSU LTD., Tokyo (JP)

(72) Inventors: Adrianus Novadri Suparman, Hirakata (JP); Hirokazu Saitou, Hirakata (JP)

(73) Assignee: KOMATSU LTD., Tokyo (JP)

( * ) Notice: Subject to any disclaimer, the term of this patent is extended or adjusted under 35 U.S.C. 154(b) by 111 days.

(21) Appl. No.: 15/301,976

(22) PCT Filed: Oct. 28, 2015

(86) PCT No.: PCT/JP2015/080425
§ 371 (c)(1),
(2) Date: Oct. 5, 2016

(87) PCT Pub. No.: WO2016/060279
PCT Pub. Date: Apr. 21, 2016

(65) Prior Publication Data
US 2017/0241316 A1 Aug. 24, 2017

(51) Int. Cl.
| F01N 3/20 | (2006.01) |
| B60K 13/04 | (2006.01) |
| B62D 55/06 | (2006.01) |
| E02F 3/32 | (2006.01) |
| E02F 9/08 | (2006.01) |

(Continued)

(52) U.S. Cl.
CPC ............ F01N 3/2066 (2013.01); B60K 13/04 (2013.01); B62D 55/06 (2013.01); E02F 3/32 (2013.01); E02F 9/0883 (2013.01); *B60Y 2200/412* (2013.01); *E02F 3/40* (2013.01); *E02F 9/163* (2013.01); *E02F 9/18* (2013.01); *E02F 9/2271* (2013.01); *F01N 2590/08* (2013.01); *F01N 2610/02* (2013.01); *F01N 2610/1413* (2013.01)

(58) Field of Classification Search
CPC ....................... E02F 9/0883; F01N 2610/1413
See application file for complete search history.

(56) References Cited

U.S. PATENT DOCUMENTS 9,677,248 B2 * 6/2017 Nakano ................. E02F 9/0891
9,845,715 B2 * 12/2017 Suemitsu .............. F01N 3/2066
(Continued)

FOREIGN PATENT DOCUMENTS

| CN | 102665486 A | 9/2012 |
| CN | 104363984 A | 2/2015 |

(Continued)

*Primary Examiner* — Brian L Swenson
(74) *Attorney, Agent, or Firm* — Drinker Biddle & Reath LLP

(57) ABSTRACT

The reducing agent tank has a tank main body and a feed pipe. The tank main body stores a reducing agent to be supplied to an exhaust gas treatment device. The feed pipe protrudes from the tank main body. The feed pipe is provided to replenish the tank main body with the reducing agent. A support base supports a vessel for the reducing agent for replenishment of the reducing agent tank. The support base is variable in position between a developed position in which the support base is arranged at a greater distance from the tank main body than from the feed pipe in a direction of protrusion of the feed pipe from the tank main body in a plan view and a stored position in which the support base is stored in an exterior cover.

10 Claims, 13 Drawing Sheets

(51) Int. Cl.
  *E02F 9/16*   (2006.01)
  *E02F 9/18*   (2006.01)
  *E02F 3/40*   (2006.01)
  *E02F 9/22*   (2006.01)

(56) References Cited

U.S. PATENT DOCUMENTS

| | | | |
|---|---|---|---|
| 2012/0255466 A1 | 10/2012 | Jarnes | |
| 2015/0016932 A1* | 1/2015 | Azuma | E02F 9/0833 414/687 |
| 2015/0090511 A1* | 4/2015 | Okuda | B60K 13/04 180/89.2 |
| 2015/0204050 A1* | 7/2015 | Kanannori | B60R 3/00 180/309 |
| 2016/0040390 A1 | 2/2016 | Ozaki | |
| 2017/0335544 A1* | 11/2017 | Imano | E02F 9/0883 |
| 2018/0044886 A1* | 2/2018 | Namai | E02F 9/0883 |

FOREIGN PATENT DOCUMENTS

| | | |
|---|---|---|
| JP | H08-192647 A | 7/1996 |
| JP | 2004-338541 A | 12/2004 |
| JP | 2011-172536 A | 9/2011 |
| JP | 5731721 B1 | 6/2015 |
| JP | 5764725 B1 | 8/2015 |

\* cited by examiner

WORK VEHICLE

TECHNICAL FIELD

The present invention relates to a work vehicle.

BACKGROUND ART

A construction for a work vehicle for allowing easy transfer of a fuel in a portable fuel replenishment vessel to a fuel tank has conventionally been proposed (see, for example, Japanese Patent Laying-Open No. 8-192647 (PTD 1)).

CITATION LIST

Patent Document

PTD 1: Japanese Patent Laying-Open No. 8-192647

SUMMARY OF INVENTION

Technical Problem

An engine and an exhaust gas treatment device for treating an exhaust gas from the engine are mounted on a work vehicle. As the exhaust gas treatment device, for example, a selective catalytic reduction device (SCR) purifying an exhaust gas by reducing nitrogen oxide in the exhaust gas is available. A reducing agent used for this exhaust gas treatment is stored in a reducing agent tank.

When a reducing agent in the reducing agent tank decreases, the reducing agent tank is replenished with the reducing agent from a reducing agent replenishment vessel. Since there is no space for placing a reducing agent replenishment vessel at the time of replenishment in a work vehicle of which vehicular body is small (for example, a hydraulic excavator of a short tail swing type), replenishment with the reducing agent is difficult.

An object of the present invention is to provide a work vehicle in which a reducing agent tank can readily be replenished with a reducing agent.

Solution to Problem

A work vehicle according to the present invention includes an engine, a vehicular body frame on which the engine is mounted, an exterior cover which covers the vehicular body frame, an exhaust gas treatment device which treats an exhaust gas from the engine through reduction reaction, a reducing agent tank, and a support base. The reducing agent tank has a tank main body and a feed pipe. The tank main body stores a reducing agent to be supplied to the exhaust gas treatment device. The feed pipe protrudes from the tank main body. The feed pipe is provided for replenishment of the tank main body with the reducing agent. The support base is constructed as a component separate from the exterior cover. The support base supports a vessel for the reducing agent for replenishment of the reducing agent tank. The support base is variable in position between a developed position in which the support base is arranged at a greater distance from the tank main body than from the feed pipe in a direction of protrusion of the feed pipe from the tank main body in a plan view and a stored position in which the support base is confined in the exterior cover.

A reducing agent and a precursor of the reducing agent are herein collectively referred to as a "reducing agent".

According to the work vehicle in the present invention, the support base can be set to the developed position during an operation for replenishment of the reducing agent tank with the reducing agent so that the vessel for the reducing agent can be placed on the support base. Thus, operability in the operation for replenishment with the reducing agent can be improved and the reducing agent tank can readily be replenished with the reducing agent.

In the work vehicle, the feed pipe protrudes from the tank main body in a direction of a vehicle width of the vehicular body frame. By arranging the support base in the stored position laterally to the feed pipe when the reducing agent tank is viewed in the direction of the vehicle width, a space for storing the support base can be secured.

The work vehicle further includes a travel unit which has a pair of crawler belts and supports the vehicular body frame. The support base in the developed position is superimposed on the crawler belt in the plan view. By thus arranging the support base in the developed position, a worker can perform an operation for replenishment with the reducing agent, with the crawler belt serving as a foothold.

In the work vehicle, the support base in the developed position is superimposed on the crawler belt in the plan view while the vehicular body frame is arranged at a position where a fore/aft direction of the vehicular body frame and a direction of travel of the travel unit match with each other. By thus arranging the support base in the developed position, a worker can perform an operation for replenishment with the reducing agent, with the crawler belt serving as a foothold.

In the work vehicle, the support base in the developed position protrudes to the outside of the vehicular body frame in a direction of a vehicle width of the vehicular body frame. Thus, operability in an operation for replenishment with the reducing agent can be improved.

In the work vehicle, the reducing agent tank is mounted on a front end portion of the vehicular body frame. A front corner portion of the vehicular body frame has a curved shape. As the support base is applied to a small work vehicle in which a front corner portion of the vehicular body frame has a curved shape, operability in an operation for replenishment with the reducing agent can be improved.

In the work vehicle, the support base in the stored position is located laterally to the feed pipe when the reducing agent tank is viewed in a direction of protrusion of the feed pipe from the tank main body. By arranging the support base in the stored position laterally to the feed pipe, a space for storing the support base can be secured.

In the work vehicle, the feed pipe has a base end portion coupled to the tank main body and a feed port. The feed port is arranged, with respect to the base end portion, opposite to a side where the support base in the stored position is located with respect to the feed pipe when the reducing agent tank is viewed in the direction of protrusion of the feed pipe from the tank main body. By doing so, a space for storing the support base can reliably be secured laterally to the feed pipe. In addition, a wider space for an operation for replenishment with the reducing agent can be secured.

The work vehicle further includes a level gauge for checking an amount of the reducing agent stored in the tank main body. The level gauge is arranged, with respect to the feed pipe, on a side where the support base in the stored position is located with respect to the feed pipe when the reducing agent tank is viewed in the direction of protrusion of the feed pipe from the tank main body. By doing so, a worker during an operation for replenishment with the reducing agent can more readily check the level gauge.

The work vehicle further includes a ceiling portion which serves as a cover above the feed pipe. The ceiling portion is provided integrally with the exterior cover. The ceiling portion is constructed to be movable to a position where the ceiling portion is not superimposed on the feed pipe in a plan view, by opening of the exterior cover. By opening the exterior cover during an operation for replenishment of the reducing agent tank with the reducing agent and moving the ceiling portion to a position where it is not superimposed on the feed pipe, interference between a hydraulic excavator and a vessel for the reducing agent can be avoided.

Advantageous Effects of Invention

According to the present invention, a reducing agent tank can readily be replenished with a reducing agent.

DESCRIPTION OF EMBODIMENTS

An embodiment of the present invention will be described hereinafter with reference to the drawings.

A construction of a hydraulic excavator in one embodiment of the present invention will initially be described.

In the present example, positional relation among portions will be described with an operator seated at an operator's seat in an operator's cab (cab) 31 being defined as the reference. A fore/aft direction refers to a fore/aft direction of the operator who sits at the operator's seat. A lateral direction (a direction of a vehicle width) refers to a lateral direction of the operator who sits at the operator's seat. An upward/downward direction refers to an upward/downward direction of the operator who sits at the driver's seat.

A direction in which the operator sitting at the operator's seat faces is defined as a fore direction and a direction opposed to the fore direction is defined as an aft direction. A right side and a left side at the time when the operator sitting at the operator's seat faces front are defined as a right direction and a left direction, respectively. A foot side of the operator who sits at the operator's seat is defined as a lower side, and a head side is defined as an upper side.

Figure 1:
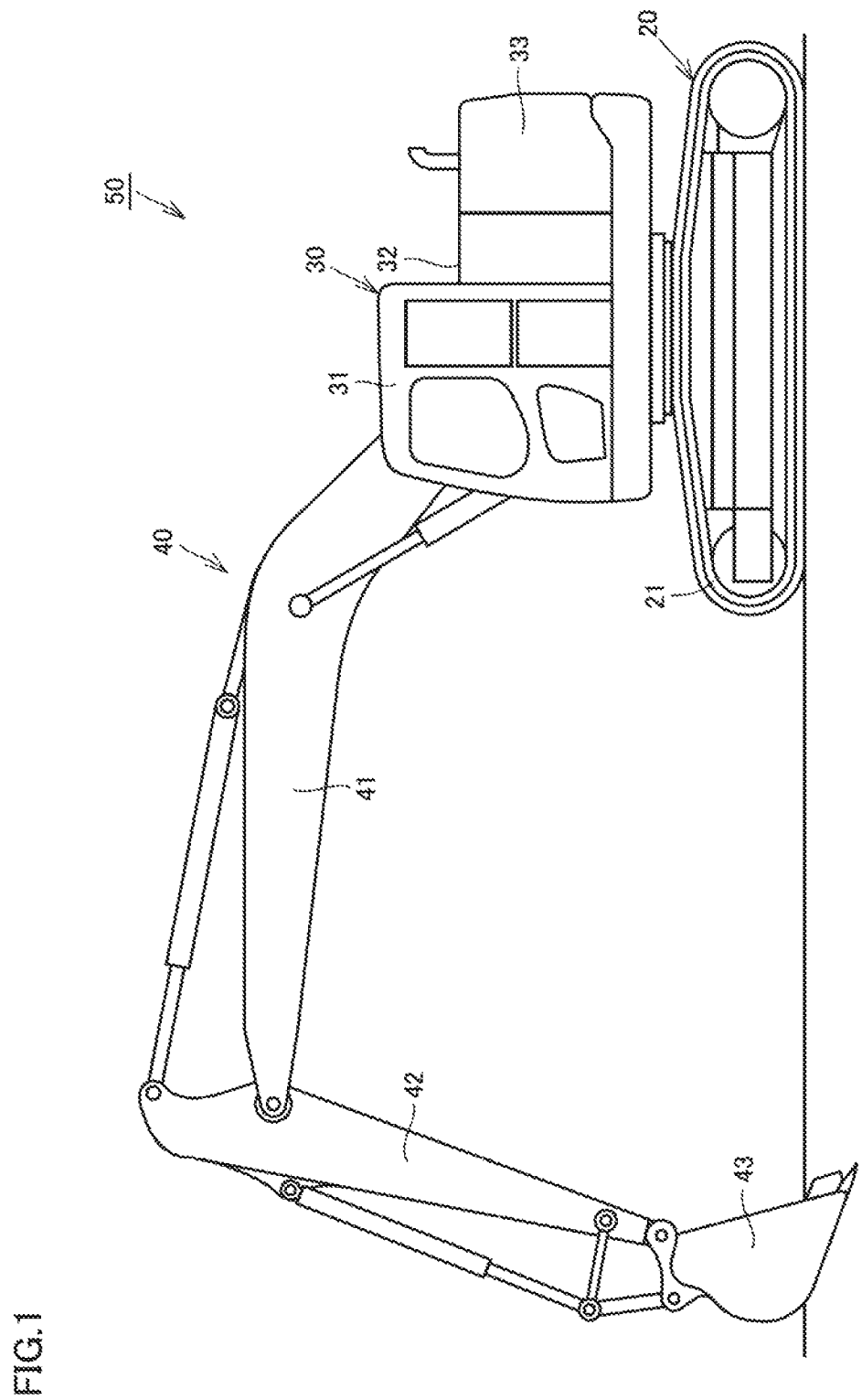
FIG. 1 is a side view schematically showing a construction of a hydraulic excavator in one embodiment of the present invention.

FIG. 1 is a side view schematically showing a construction of a hydraulic excavator according to one embodiment of the present invention. As shown in FIG. 1, a hydraulic excavator 50 in the present embodiment is, for example, a minimal swing radius hydraulic excavator. The minimal swing radius hydraulic excavator can fully revolve with a slewing radius of a rear end of a revolving unit being within 120% of the total width of a travel unit in order to secure safety in the rear of a vehicular body during slewing, although it fully revolves with a front minimal slewing radius exceeding 120% thereof (see the definition under Japanese Industrial Standards (JIS A 8340-4)).

Hydraulic excavator 50 mainly has a travel unit 20, a revolving unit 30, and a work implement 40. Travel unit 20 and revolving unit 30 constitute a vehicular body of hydraulic excavator 50.

Travel unit 20 has a pair of left and right crawler belts 21. Hydraulic excavator 50 is constructed to be self-propelled as the pair of left and right crawler belts 21 is driven to rotate.

Revolving unit 30 is set to be revolvable with respect to travel unit 20. Revolving unit 30 mainly has operator's cab 31, an engine hood 32, and a counterweight 33.

Operator's cab 31 is arranged on a front left side (a front side of the vehicle) of revolving unit 30. Engine hood 32 and counterweight 33 are arranged on a rear side of revolving unit 30 (a rear side of the vehicle).

Engine hood 32 is arranged to cover an engine compartment from above. An engine unit (such as the engine and an exhaust gas treatment unit 10) is accommodated in the engine compartment. Counterweight 33 is arranged in the rear of and lateral to the engine compartment for keeping balance of a vehicular body during excavation or the like.

Work implement 40 serves for such work as excavation of soil. Work implement 40 is pivotally supported on the front side of revolving unit 30. Work implement 40 has, for example, a boom 41, an arm 42, a bucket 43, and a hydraulic cylinder. Boom 41 has a base end portion rotatably coupled to revolving unit 30. Arm 42 has a base end portion rotatably coupled to a tip end portion of boom 41. Bucket 43 is rotatably coupled to a tip end portion of arm 42. Work implement 40 can be driven as each of boom 41, arm 42, and bucket 43 is driven by the hydraulic cylinder.

Figure 2:
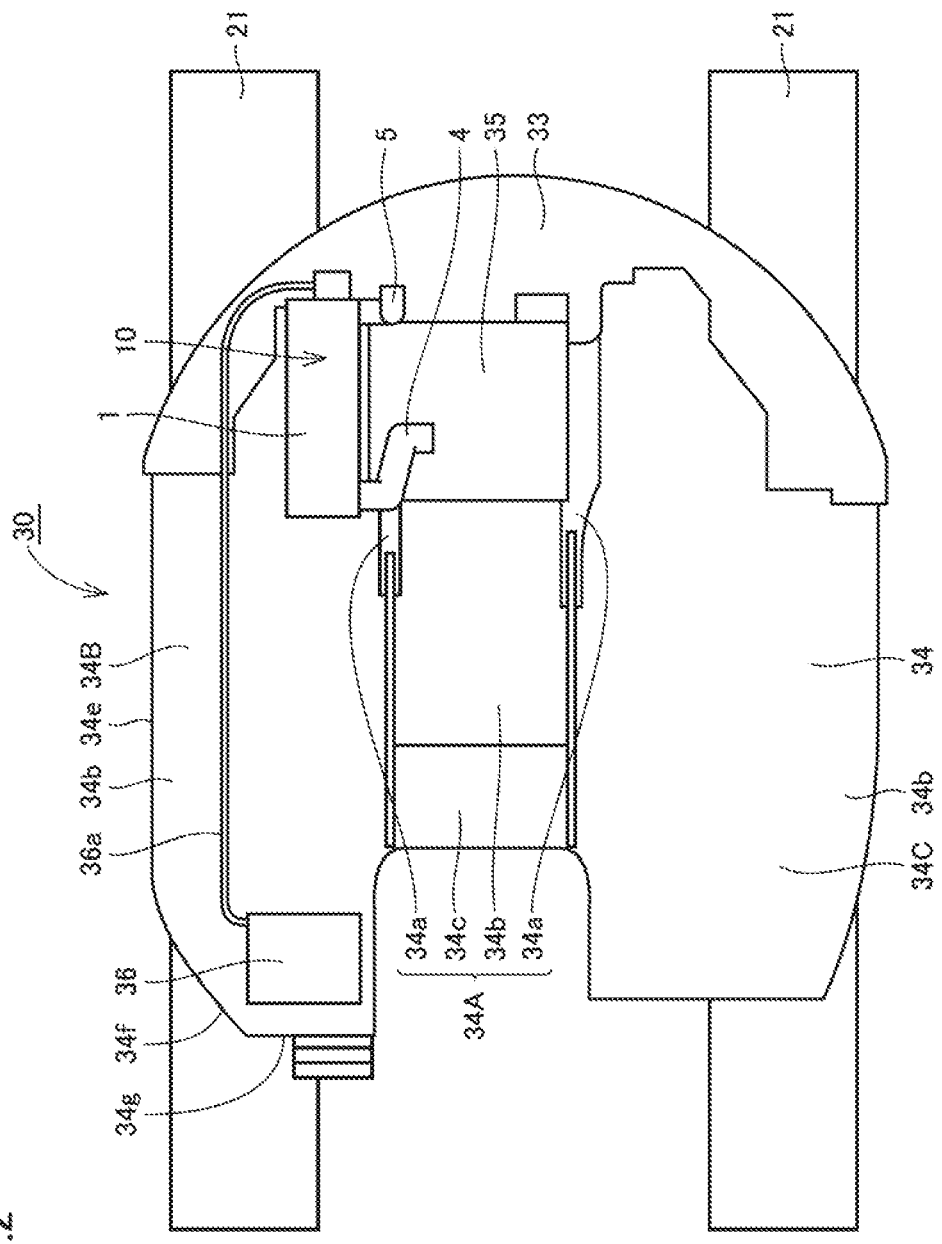
FIG. 2 is a plan view showing positions of an engine, an exhaust gas treatment unit, a reducing agent tank, and a counterweight in the hydraulic excavator shown in FIG. 1.

FIG. 2 is a plan view showing positions of the engine, the exhaust gas treatment unit, a reducing agent tank, and the counterweight in the hydraulic excavator shown in FIG. 1. As shown in FIG. 2, revolving unit 30 includes exhaust gas treatment unit 10, counterweight 33, a revolving frame 34, an engine 35, and a reducing agent tank 36. Exhaust gas treatment unit 10, counterweight 33, engine 35, and reducing agent tank 36 are mounted on revolving frame 34 and arranged on an upper surface of revolving frame 34.

Counterweight 33 is a weight arranged in a portion in the rear of revolving unit 30 for keeping balance of a vehicular body during excavation or the like. Counterweight 33 is located in the rear of engine 35 and exhaust gas treatment unit 10 in the plan view. Counterweight 33 has a rear surface in an annular shape in a plan view. The plan view herein means a view downward from above as shown in FIG. 2, in a direction perpendicular to the upper surface of a bottom plate 34b of revolving frame 34.

Revolving frame 34 forms a vehicular body frame of hydraulic excavator 50. Revolving frame 34 is supported by travel unit 20. Revolving frame 34 mainly has a pair of vertical plates 34a, bottom plate 34b, and a coupling plate 34c. Bottom plate 34b is formed from a steel plate having a large thickness. The pair of vertical plates 34a is located in the center in the lateral direction of revolving frame 34. Each of the pair of vertical plates 34a is provided orthogonal to an upper surface of bottom plate 34b and erected upward from the upper surface of bottom plate 34b.

The pair of vertical plates 34a is arranged at a distance from each other in the direction of the vehicle width of the vehicle and extends along the fore/aft direction. Each of the pair of vertical plates 34a is inclined such that a dimension in the upward/downward direction is smaller from a front end side toward a rear end. The pair of vertical plates 34a is coupled to each other by coupling plate 34c at a front end portion thereof.

The pair of vertical plates 34a and coupling plate 34c constitute a center bracket supporting the base end portion of work implement 40. A hole for a boom foot pin allowing upward/downward actuation of work implement 40 is formed in each of the pair of vertical plates 34a.

The pair of vertical plates 34a, a portion of bottom plate 34b lying between the pair of vertical plates 34a, and coupling plate 34c constitute a center frame 34A. A portion of bottom plate 34b located on the right of center frame 34A forms a right deck frame 34B. A portion of bottom plate 34b located on the left of center frame 34A forms a left deck frame 34C. Center frame 34A, right deck frame 34B, and left deck frame 34C are integrally formed with bottom plate 34b being shared thereamong.

Counterweight 33 is attached to revolving frame 34 across center frame 34A, right deck frame 34B, and left deck frame 34C.

Engine 35 is mounted in the engine compartment in a portion in the rear of revolving frame 34. Since engine 35 is large in weight, it is arranged in the rear of revolving frame 34, in consideration of weight balance with work implement 40. Engine 35 is supported on the pair of left and right vertical plates 34a. Engine 35 is mounted on revolving frame 34 with an engine mount portion (not shown) being interposed.

Exhaust gas treatment unit 10 is connected to engine 35 and constructed to treat an exhaust from engine 35. Exhaust gas treatment unit 10 is arranged laterally to engine 35. Exhaust gas treatment unit 10 is arranged, for example, on the right of engine 35. Exhaust gas treatment unit 10 is supported on revolving frame 34.

Reducing agent tank 36 stores a reducing agent therein. For example, a urea solution is employed as the reducing agent. Reducing agent tank 36 is mounted on right deck frame 34B of revolving frame 34. Reducing agent tank 36 is mounted on revolving frame 34 at a front end portion in the vicinity of a front end 34g of right deck frame 34B. Reducing agent tank 36 is arranged in a front right portion of revolving frame 34. A curved portion 34f which is a curved part of an outer peripheral edge 34e is formed in a front right corner portion of outer peripheral edge 34e of two-dimensionally viewed revolving frame 34, which is close to a position where reducing agent tank 36 is arranged. The front right corner portion of revolving frame 34 has a curved shape.

Reducing agent tank 36 is connected to exhaust gas treatment unit 10 through a reducing agent pipe 36a. The reducing agent in reducing agent tank 36 can be transferred through reducing agent pipe 36a to exhaust gas treatment unit 10 by a reducing agent pump (not shown). The reducing agent supplied to exhaust gas treatment unit 10 through reducing agent pipe 36a reacts with nitrogen oxide contained in the exhaust in exhaust gas treatment unit 10. Thus, a concentration of nitrogen oxide in the exhaust lowers. The exhaust of which amount of nitrogen oxide has lowered to an appropriate value is emitted from exhaust gas treatment unit 10.

Exhaust gas treatment unit 10 mainly has an exhaust gas treatment device 1, a connection pipe 4, and an emission pipe 5.

Exhaust gas treatment device 1 is connected to engine 35 through connection pipe 4. Exhaust gas treatment device 1 is constructed to treat an exhaust gas emitted from engine 35. Connection pipe 4 is constructed to guide the exhaust gas emitted from engine 35 to exhaust gas treatment device 1.

Emission pipe 5 is connected to exhaust gas treatment device 1. Emission pipe 5 is constructed to emit the exhaust gas which has passed through exhaust gas treatment device 1 into atmosphere.

The exhaust emitted from engine 35 sequentially passes through connection pipe 4, exhaust gas treatment device 1, and emission pipe 5 and is emitted into atmosphere from an opening portion at an upper end of emission pipe 5.

Exhaust gas treatment device 1 is implemented, for example, by a $NO_x$ removal device of a selective catalytic reduction type. Exhaust gas treatment device 1 reduces nitrogen oxide contained in the exhaust through reaction with a reducing agent and chemically changes the nitrogen oxide to a harmless nitrogen gas, to thereby lower a concentration of the nitrogen oxide in the exhaust. Exhaust gas treatment device 1 is a device treating an exhaust gas from engine 35 through reduction reaction. Exhaust gas treatment device 1 applies, in principle, reduction of ammonia ($NH_3$) to harmless nitrogen ($N_2$) and water ($H_2O$) as a result of chemical reaction with nitrogen oxide ($NO_x$).

Here, ammonia is not loaded on hydraulic excavator 50, but reducing agent tank 36 containing a urea solution is mounted on hydraulic excavator 50 as the reducing agent tank. For example, the urea solution is suitably used as the reducing agent, however, the reducing agent is not limited thereto, and anything which can reduce nitrogen oxide is acceptable. The reducing agent stored in reducing agent tank 36 is supplied to exhaust gas treatment device 1 through reducing agent pipe 36a.

Exhaust gas treatment unit 10 may include, in addition to exhaust gas treatment device 1 representing a $NO_x$ removal device of a selective catalytic reduction type, any other exhaust gas treatment device such as a diesel particulate filter device or a diesel oxidation catalyst device.

Figure 3:
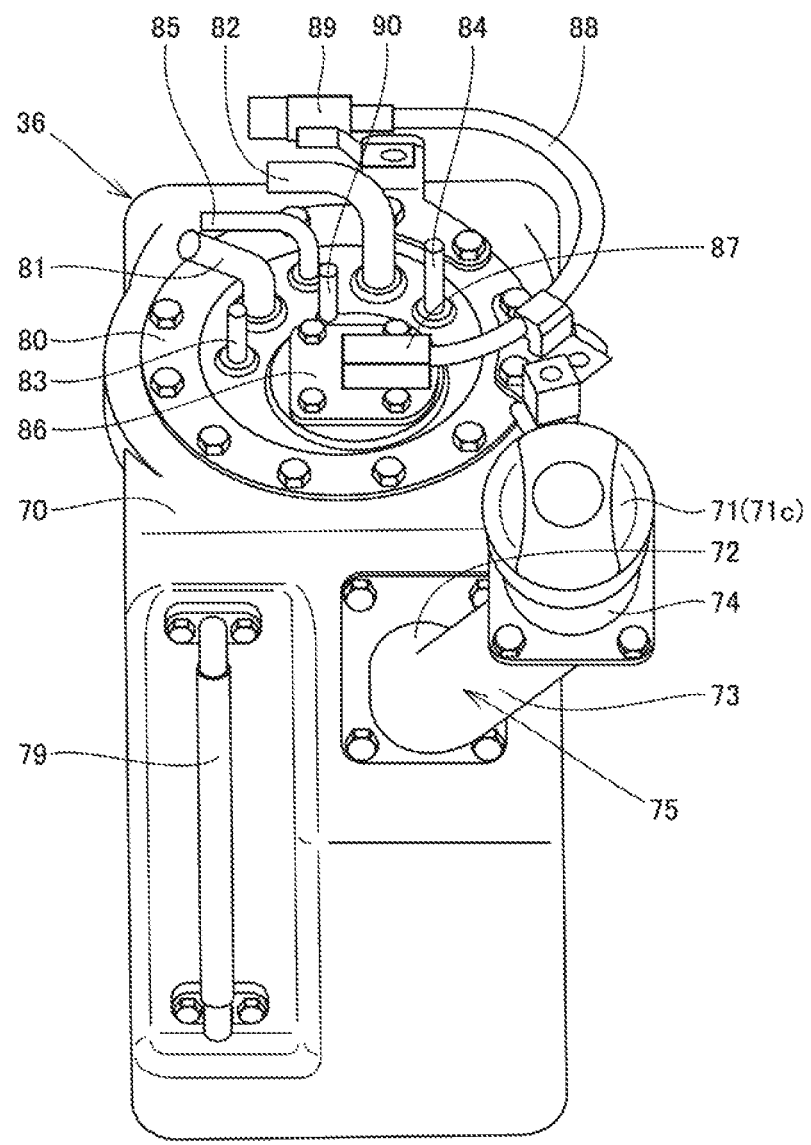
FIG. 3 is a perspective view schematically showing a construction of the reducing agent tank.

FIG. 3 is a perspective view schematically showing a construction of reducing agent tank 36. Reducing agent tank 36 has a tank main body 70 as shown in FIG. 3. Tank main body 70 has an outer shape like a substantially rectangular box. A space storing a reducing agent is formed in tank main body 70. Tank main body 70 stores a reducing agent to be supplied to exhaust gas treatment device 1. Tank main body 70 is integrally formed from a resin material excellent in corrosion resistance such as polyethylene.

An opening is formed in an upper surface of tank main body 70. This opening is closed by a disc-shaped lid 80. Lid 80 is removably attached to tank main body 70 with a bolt. A sealing member such as an O ring is provided between the upper surface of tank main body 70 and lid 80, so that the opening is liquid-tightly sealed as lid 80 is fixed to the upper surface. Lid 80 is formed, for example, from a metal material high in rigidity.

An outlet 83 through which a reducing agent flows out of tank main body 70 and a return port 84 through which the reducing agent not used for exhaust gas treatment but returned to tank main body 70 flows are attached to lid 80.

Pipe paths 81 and 82 are attached to lid 80. Pipe paths 81 and 82 form a part of a heat exchanger which exchanges heat with the reducing agent. The heat exchanger is arranged in tank main body 70. The heat exchanger is suspended from lid 80. A medium which exchanges heat with the reducing agent flows through the heat exchanger. A medium which flows into tank main body 70 flows through pipe path 81. A medium which flows out of tank main body 70 flows through pipe path 82.

An attachment sheet 86 is removably fastened to lid 80 with a bolt. Attachment sheet 86 supports a base portion 87 of a sensor measuring a level, a concentration, and a temperature of the reducing agent in tank main body 70. A harness 88 is provided to protrude from base portion 87. A connector 89 is provided at a tip end of harness 88. Values for the measured level, concentration, and temperature of the reducing agent are output to a not-shown controller via harness 88 and connector 89.

A breather 85 is attached to lid 80. Breather 85 is provided to automatically keep a pneumatic pressure in tank main body 70 constant. When air in tank main body 70 expands or contracts due to change in atmospheric temperature, air is emitted or suctioned via breather 85 so that a pressure in tank main body 70 can be held constant.

Reducing agent tank 36 has a feed pipe 75 for refilling tank main body 70 with a reducing agent. Feed pipe 75 has one end coupled to a side surface of tank main body 70. Feed pipe 75 is provided to protrude from tank main body 70. Feed pipe 75 has a base end portion 72, an intermediate portion 73, and a tip end portion 74. A feed port 71 is formed at a tip end portion of tip end portion 74. In the construction shown in FIG. 3, a cap 71*c* is attached to feed port 71 so that feed port 71 is closed by cap 71*c*.

As shown in FIG. 3, feed pipe 75 has a bent shape. Base end portion 72 is coupled to tank main body 70 and protrudes from tank main body 70. Intermediate portion 73 is coupled to base end portion 72. A direction in which intermediate portion 73 extends is different from a direction in which base end portion 72 extends. Intermediate portion 73 extends in a direction intersecting a direction in which base end portion 72 protrudes from tank main body 70. Tip end portion 74 is coupled to intermediate portion 73. Tip end portion 74 extends substantially in parallel to base end portion 72. Tip end portion 74 and base end portion 72 are coupled to each other with intermediate portion 73 being interposed.

Tip end portion 74 is arranged on the right in FIG. 3 with respect to base end portion 72. Feed port 71 is arranged on the right in FIG. 3 with respect to base end portion 72. Base end portion 72 and tip end portion 74 are offset from each other in the lateral direction in FIG. 3. Base end portion 72 has a function as a coupling pipe portion coupled to tank main body 70. Tip end portion 74 has a function as an offset pipe portion arranged as being displaced from base end portion 72.

An air vent hole 90 is formed in lid 80. When tank main body 70 is replenished with the reducing agent through feed pipe 75, air which has been present in tank main body 70 flows out of tank main body 70 through air vent hole 90.

A level gauge 79 is attached to a side surface of tank main body 70. Level gauge 79 is provided for checking of an amount of a reducing agent stored in tank main body 70. Level gauge 79 is attached to the side surface the same as the surface where feed pipe 75 is provided, among a plurality of side surfaces of tank main body 70. Level gauge 79 is arranged on the left in FIG. 3 with respect to feed pipe 75. Level gauge 79 is arranged, with respect to feed pipe 75, opposite to a side where feed pipe 75 protruding from tank main body 70 is bent.

Figure 4:
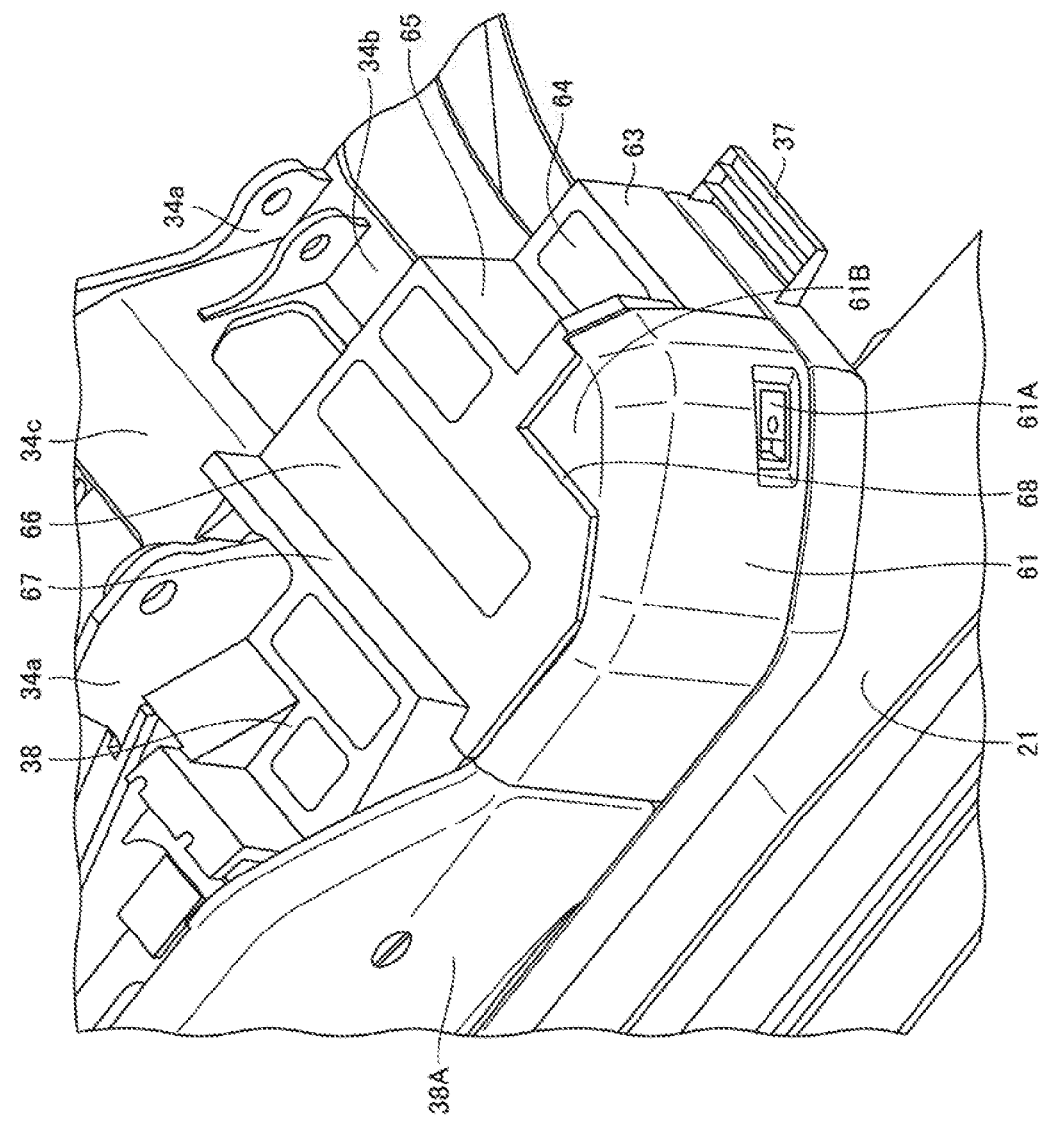
FIG. 4 is a perspective view showing a part of appearance of the hydraulic excavator.

FIG. 4 is a perspective view showing a part of appearance of hydraulic excavator 50. FIG. 4 shows a part of the construction when hydraulic excavator 50 shown in FIG. 1 is viewed from front right. A front cover is provided on a front right side of revolving unit 30 of hydraulic excavator 50. A tank room accommodating reducing agent tank 36 and a valve room accommodating a main valve are formed in the front cover. The front cover has a front end plate 63, a step plate 64, a standing plate 65, and a ceiling plate 66.

Front end plate 63 is provided to extend in a vertical direction at the front end of revolving unit 30. Step plate 64 extends rearward from an upper edge of front end plate 63. Standing plate 65 extends upward from a rear edge of step plate 64. Ceiling plate 66 extends rearward from an upper edge of standing plate 65. A ceiling portion 61B is arranged substantially flush with ceiling plate 66. Ceiling portion 61B serves as a cover above feed pipe 75 of reducing agent tank 36. Ceiling portion 61B is provided as a member different from ceiling plate 66. A cut portion 68 is formed in the front cover of hydraulic excavator 50. Ceiling portion 61B is fitted into cut portion 68.

A step 37 is provided as protruding forward from front end plate 63. Front end plate 63, step plate 64, standing plate 65 and ceiling plate 66 form a shape like stairs. Access to the top of ceiling plate 66 can readily be made by successively stepping on step plate 64 from step 37. Thus, a worker can readily and safely perform such an operation as replenishment of a fuel tank with a fuel, supply of oil to a hydraulic oil tank, and maintenance of engine 35.

A tank cover 38 is arranged in the rear of the front cover. A hydraulic oil tank is accommodated under tank cover 38. A front surface plate 67 of tank cover 38 extends upward from a rear edge of ceiling plate 66. A right side surface of the hydraulic oil tank is covered with an exterior cover 38A. Exterior cover 38A forms a part of a side surface of hydraulic excavator 50.

An exterior cover 61 extends from a front end of exterior cover 38A toward the front end of revolving unit 30. Exterior cover 61 forms a right side surface of the front cover and forms a part of the side surface of the vehicular body of hydraulic excavator 50. Exterior cover 61 laterally covers revolving frame 34. Exterior cover 61 is provided to be opened and closed. Exterior cover 61 has a handgrip 61A. A worker can open closed exterior cover 61 by holding handgrip 61A and pivoting exterior cover 61.

Figure 5:
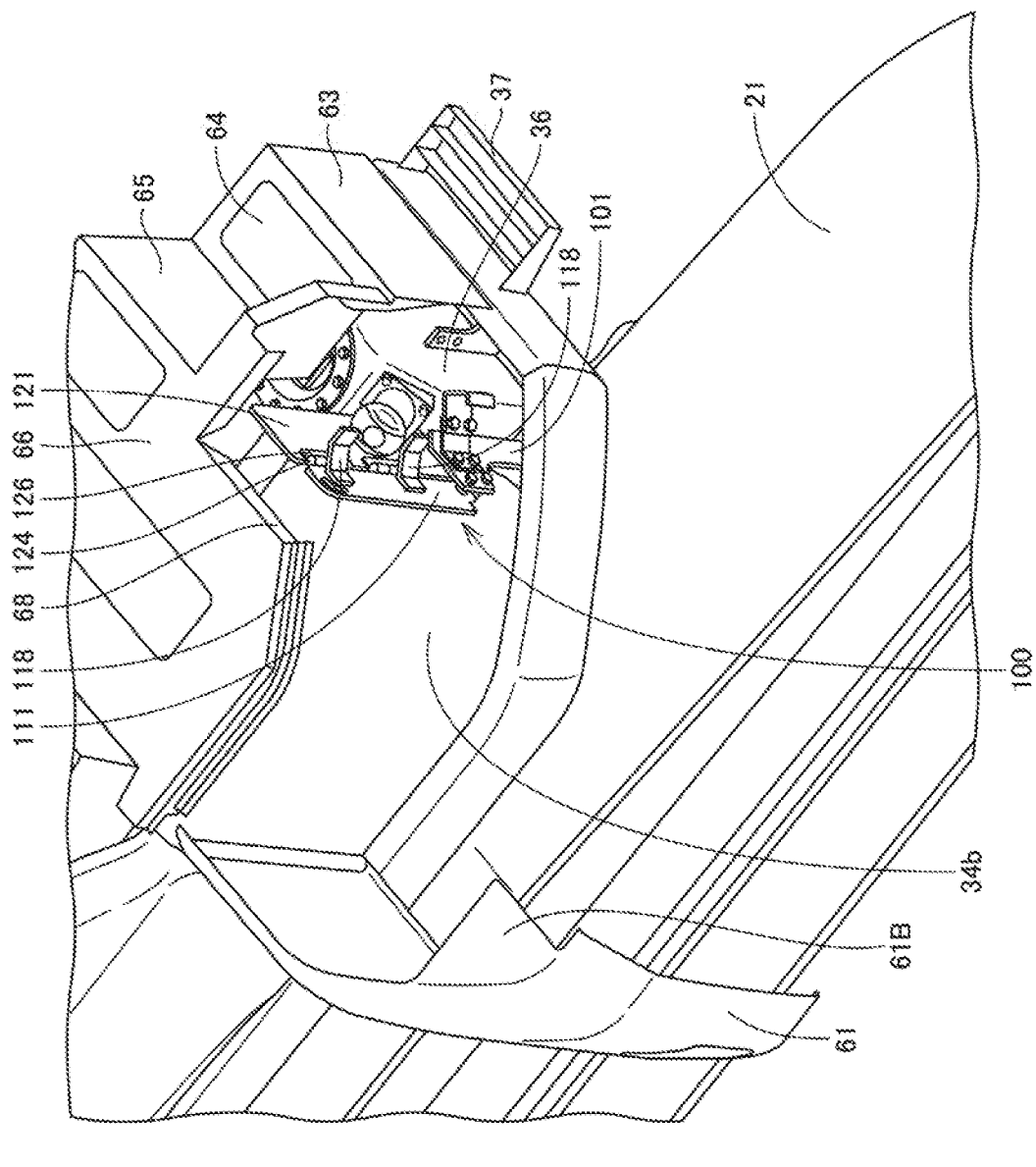
FIG. 5 is a perspective view showing a state that an exterior cover has been opened.

FIG. 5 is a perspective view showing a state that exterior cover 61 has been opened. Though various types of equipment such as a main valve for supplying a hydraulic oil to work implement 40 or a pump for delivering the reducing agent are arranged in addition to reducing agent tank 36 in a space covered with exterior cover 61 on revolving frame 34, the equipment is not shown for the sake of brevity in FIG. 5 and subsequent figures.

Ceiling portion 61B is provided integrally with exterior cover 61. By opening exterior cover 61, ceiling portion 61B also pivots together with exterior cover 61. Ceiling portion 61B is constructed to be movable relative to reducing agent tank 36. Ceiling portion 61B is movable from a space above feed pipe 75. Ceiling portion 61B is constructed to be movable to a position where it is not superimposed on feed pipe 75 in a plan view, by opening of exterior cover 61. By moving ceiling portion 61B from the space above feed pipe 75, the space above feed pipe 75 can be opened.

As shown in FIG. 5, feed pipe 75 of reducing agent tank 36 protrudes from tank main body 70 in the direction of the vehicle width. Feed pipe 75 protrudes from tank main body 70 to the right.

As shown in FIG. 5, a support base 100 is arranged on the right of reducing agent tank 36. Support base 100 is provided to support a vessel for a reducing agent with which reducing agent tank 36 is replenished. Support base 100 is formed as a component separate from exterior cover 61.

Figure 6:
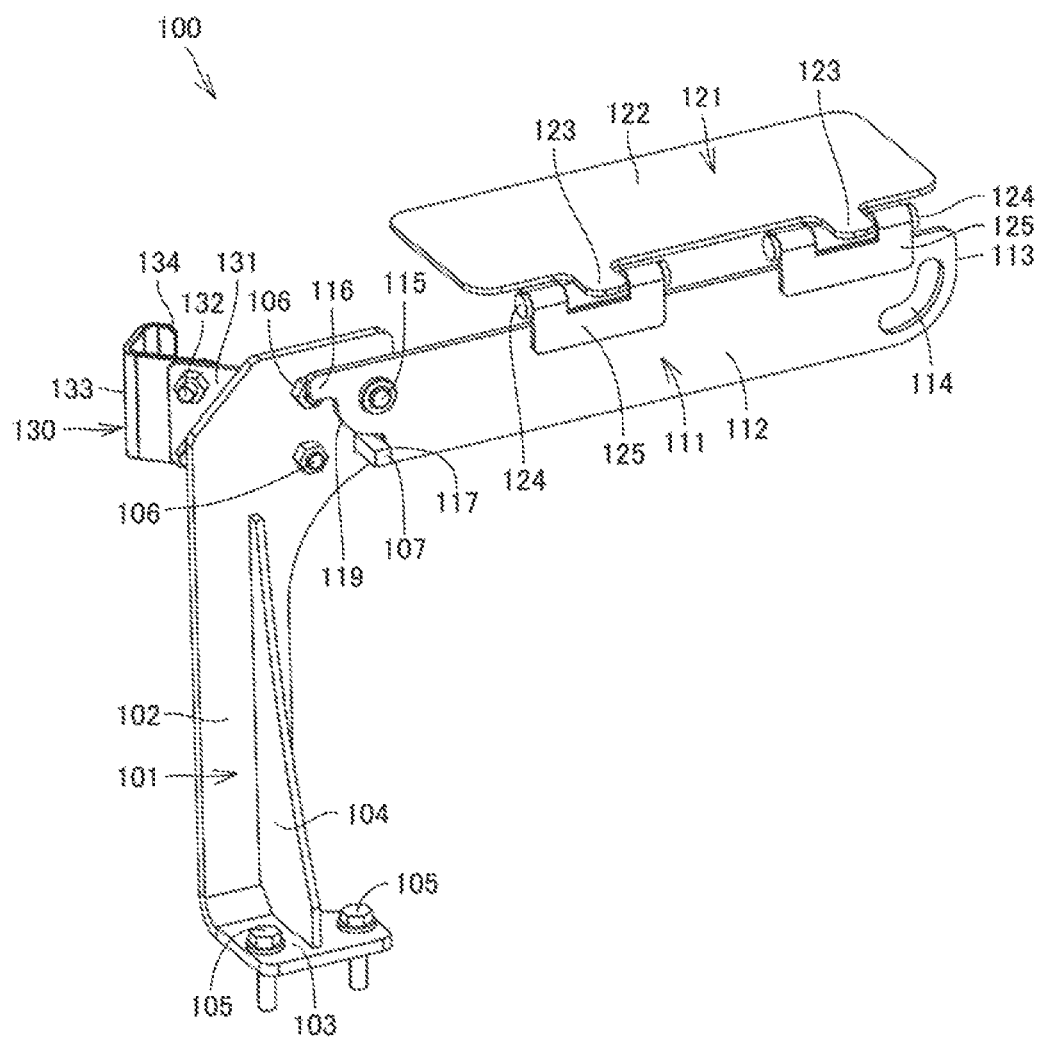
FIG. 6 is a perspective view showing a construction of a support base.

FIG. 6 is a perspective view showing a construction of support base 100. As shown in FIG. 6, support base 100 has a support post portion 101, a movable arm portion 111, and a movable base portion 121.

Support post portion 101 mainly has a post portion 102, a fixing portion 103, and a rib portion 104. Post portion 102 has a shape like a flat plate. Fixing portion 103 is fixed to an upper surface of bottom plate 34b of revolving frame 34 with a bolt 105. Two through holes are formed in fixing portion 103. As two bolts 105 pass through the through holes in fixing portion 103 and are fastened to bottom plate 34b, fixing portion 103 is fixed to bottom plate 34b.

Post portion 102 extends in a direction orthogonal to fixing portion 103. While fixing portion 103 is fixed to bottom plate 34b, post portion 102 vertically extends. Rib portion 104 extends as being orthogonal to both of fixing portion 103 and post portion 102. Rib portion 104 is provided to improve strength of support post portion 101.

A plurality of through holes passing through post portion 102 in a direction of thickness are formed in post portion 102. A bolt is inserted in the through hole in post portion 102, and the bolt is fixed by using a nut 106. The bolt and nut 106 fix a hook member 130 to support post portion 101.

Hook member 130 has a coupling portion 131 and a bent portion 133. Coupling portion 131 is fixed to post portion 102 of support post portion 101 with the bolt and nut 106 described above. Coupling portion 131 and bent portion 133 are fixed to each other with a bolt 132. A hook portion 134 is provided at a tip end of bent portion 133.

When exterior cover 61 described with reference to FIGS. 4 and 5 is closed, hook portion 134 is engaged with an inner surface of exterior cover 61. Exterior cover 61 is thus held in a closed state. When exterior cover 61 is opened, hook portion 134 and exterior cover 61 are disengaged from each other by operating handgrip 61A. Exterior cover 61 can thus readily be opened.

A pivot shaft portion 115 is inserted in another through hole formed in post portion 102. A stopper 107 protruding from a surface is provided in post portion 102.

Movable arm portion 111 has an arm portion 112. Arm portion 112 has a shape like a flat plate. Arm portion 112 is provided to be pivotable by 90° with respect to support post portion 101, with pivot shaft portion 115 being defined as the center of pivot. Arm portion 112 has a distal end 113 distant from support post portion 101 and a proximal end opposite to distal end 113. Pivot shaft portion 115 is provided in the vicinity of the proximal end of end portions of arm portion 112.

A finger hole 114 is formed in the vicinity of distal end 113 of arm portion 112. Finger hole 114 is formed to pass through arm portion 112 in a direction of thickness.

A pair of engagement portions 116 and 117 is formed in the vicinity of the proximal end of arm portion 112. An arc edge portion 119 is formed between engagement portion 116 and engagement portion 117. Arc edge portion 119 is a part having an arc shape around pivot shaft portion 115, of an edge of arm portion 112 in a shape of a plate shape. A radius of arc edge portion 119 is smaller than a distance from pivot shaft portion 115 to stopper 107. Engagement portions 116 and 117 protrude radially outward around pivot shaft portion 115, with respect to arc edge portion 119. A distance from pivot shaft portion 115 to engagement portions 116 and 117 is greater than a radius of arc edge portion 119.

In a position shown in FIG. 6, engagement portion 117 of the pair of engagement portions 116 and 117 is engaged with stopper 107. As stopper 107 and engagement portion 117 are engaged with each other, clockwise movement of movable arm portion 111 in FIG. 6 around pivot shaft portion 115 is blocked. Thus, as shown in FIG. 6, movable arm portion 111 can be arranged at a position where arm portion 112 extends in a direction orthogonal to post portion 102.

When movable arm portion 111 is turned by 90° counterclockwise around pivot shaft portion 115 from the arrangement shown in FIG. 6, engagement portion 116 of the pair of engagement portions 116 and 117 is engaged with stopper 107. Engagement between stopper 107 and engagement portion 117 blocks counterclockwise movement of movable arm portion 111 in FIG. 6 around pivot shaft portion 115. In this state, arm portion 112 extends in parallel to post portion 102.

Movable base portion 121 has a support base portion 122. Support base portion 122 has a shape like a flat plate. Support base portion 122 has a substantially rectangular shape of which four corners are roundly beveled. One pair of engagement protrusions 123 protrudes from one of long sides of support base portion 122.

Movable base portion 121 is attached to movable arm portion 111 by means of a pair of hinges. This hinge has a hinge shaft 124, a first hinge plate 125, and a second hinge plate 126 (see FIG. 5) which is not shown in FIG. 6. First hinge plate 125 is fixed to arm portion 112. Second hinge plate 126 is fixed to support base portion 122. First hinge plate 125 and second hinge plate 126 are pivotable with respect to each other around hinge shaft 124. Therefore, movable base portion 121 is pivotable around hinge shaft 124 with respect to movable arm portion 111.

In the position shown in FIG. 6, support base portion 122 extends in a direction orthogonal to arm portion 112. The position of support base 100 in which arm portion 112 is orthogonal to post portion 102 and support base portion 122 is orthogonal to arm portion 112 shown in FIG. 6 is referred to as a developed position.

Figure 7:
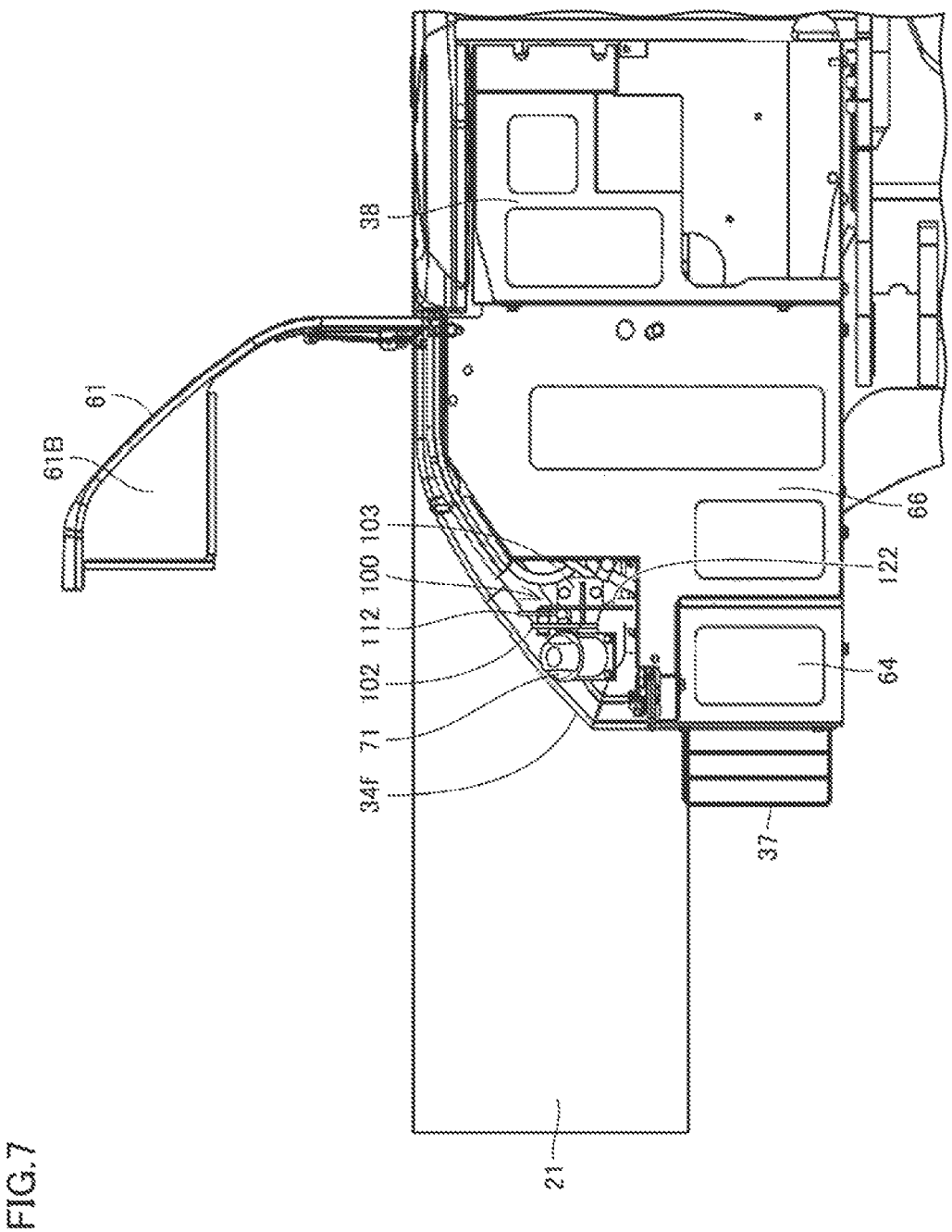
FIG. 7 is a plan view showing a state that the exterior cover has been opened.

FIG. 7 is a plan view showing a state that exterior cover 61 has been opened. Support base 100 shown in FIG. 7 is arranged in a range of two-dimensionally viewed revolving frame 34. In a state that exterior cover 61 is closed shown in FIG. 4, support base 100 is stored in a space defined by the front cover and exterior cover 61 of hydraulic excavator 50 (the tank room for accommodating reducing agent tank 36).

Support base 100 shown in FIG. 7 takes a position different from the developed position shown in FIG. 6.

More specifically, movable arm portion 111 is turned by 90° around pivot shaft portion 115 from the developed position, so that arm portion 112 extends in parallel to post portion 102. As engagement portion 116 is engaged with stopper 107, the position of this movable arm portion Ellis held. In addition, movable base portion 121 is turned by 90° around hinge shaft 124, so that support base portion 122 extends in parallel to arm portion 112. As engagement protrusion 123 is engaged with first hinge plate 125, the position of this movable base portion 121 is held. Such a position of support base 100 is referred to as a stored position.

As shown in FIG. 7, the entire support base 100 in the stored position is arranged inside the outer peripheral edge of revolving frame 34. Support base 100 in the stored position is confined in revolving frame 34 in a plan view. Support base 100 in the stored position is confined in exterior cover 61.

Referring also to FIG. 5, support base 100 in the stored position is arranged in the rear of feed pipe 75 of reducing agent tank 36. Feed pipe 75 protrudes from tank main body 70 in the direction of the vehicle width of revolving frame 34. In the present embodiment, feed pipe 75 protrudes from tank main body 70 to the right. When reducing agent tank 36 is viewed from the right, support base 100 in the stored position is located on the left of feed pipe 75. When reducing agent tank 36 is viewed from the right, level gauge 79 attached to reducing agent tank 36 is arranged on the left of feed pipe 75 and on the left of support base 100 in the stored position.

In order to avoid movable arm portion 111 of support base 100 in the stored position unintentionally turning around pivot shaft portion 115 and falling toward exterior cover 61, a not-shown locking mechanism for holding support base 100 in the stored position is provided in support base 100. The locking mechanism may be constructed to fix support base 100 to any portion of the vehicular body such as the front cover of hydraulic excavator 50.

Figure 8:
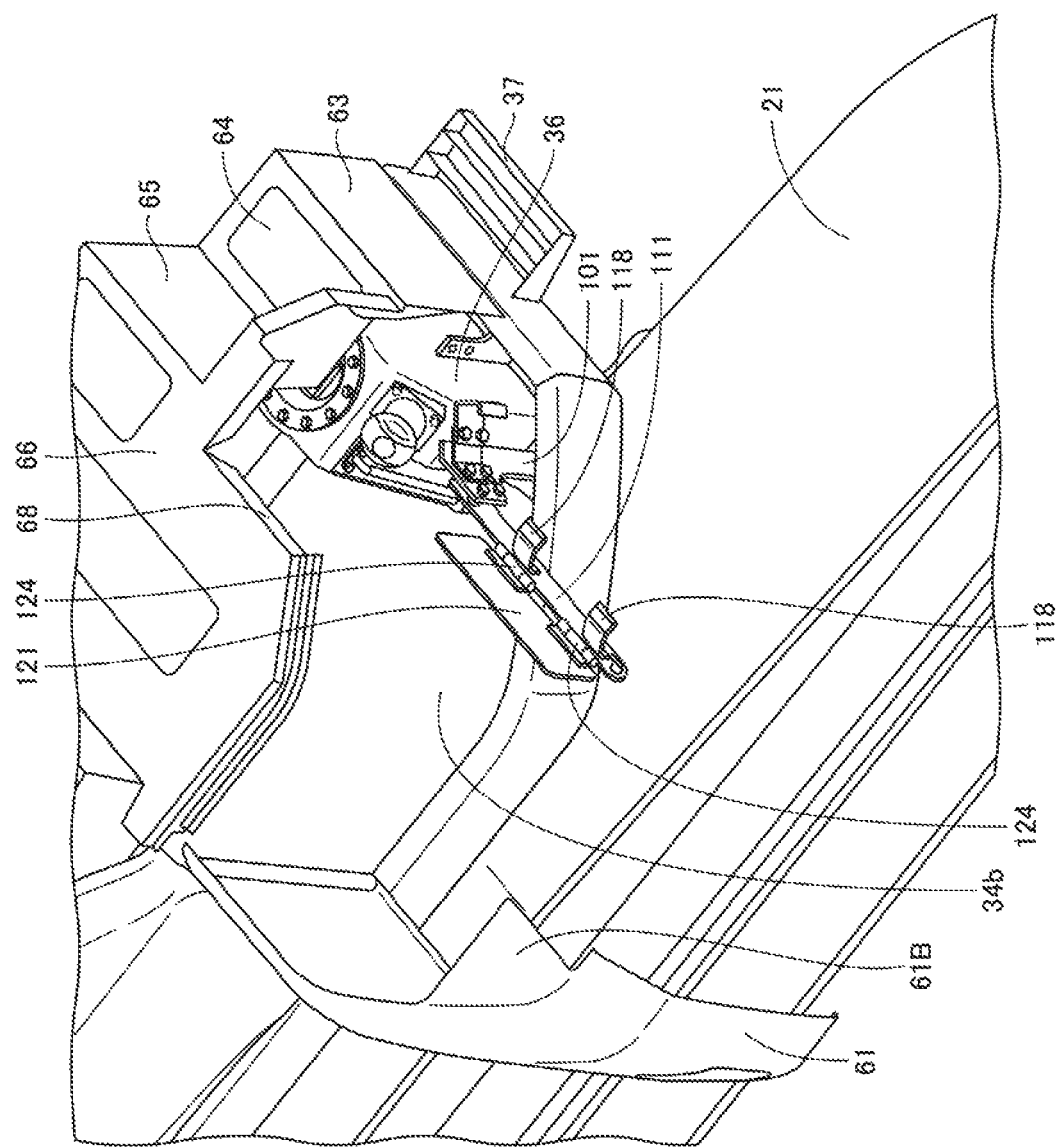
FIG. 8 is a perspective view showing a state that a movable arm portion of the support base has been developed.

FIG. 8 is a perspective view showing a state that movable arm portion 111 of support base 100 has been developed. Support base 100 shown in FIG. 8 takes a position different from both of the developed position and the stored position.

More specifically, movable arm portion 111 is arranged similarly to the developed position, and arm portion 112 is orthogonal to post portion 102. Movable base portion 121 is arranged similarly to the stored position, and support base portion 122 extends in parallel to arm portion 112. Such a position of support base 100 is referred to as an intermediately developed position.

Support base 100 in the present embodiment is constructed to be able to arbitrarily take any position of the stored position, the intermediately developed position, and the developed position. The intermediately developed position is formed by inserting a finger in finger hole 114 from the stored position and tilting movable arm portion 111 by 90°. Alternatively, the intermediately developed position is formed by turning movable base portion 121 by 90° from the developed position so as to erect the movable base portion. The stored position is formed by turning movable arm portion 111 by 90° from the intermediately developed position so as to erect the movable arm portion. The developed position is formed by tilting movable base portion 121 by 90° from the intermediately developed position.

In the intermediately developed position shown in FIG. 8, a part of movable arm portion 111 of support base 100 and at least a part of movable base portion 121 protrude to the outside of revolving frame 34. Movable arm portion 111 is arranged over curved portion 34f formed in the front right corner portion of revolving frame 34, across a position above revolving frame 34 and a position extending off from revolving frame 34.

As shown in FIGS. 5 and 8, placement portion 118 is attached to arm portion 112. When support base 100 is in the developed position, movable base portion 121 is placed on placement portion 118. Thus, a structure allowing stable support of movable base portion 121 is achieved. A rubber sheet is bonded to placement portion 118. As movable base portion 121 is placed on the rubber sheet, movable base portion 121 can be supported in a more stable manner.

Figure 9:
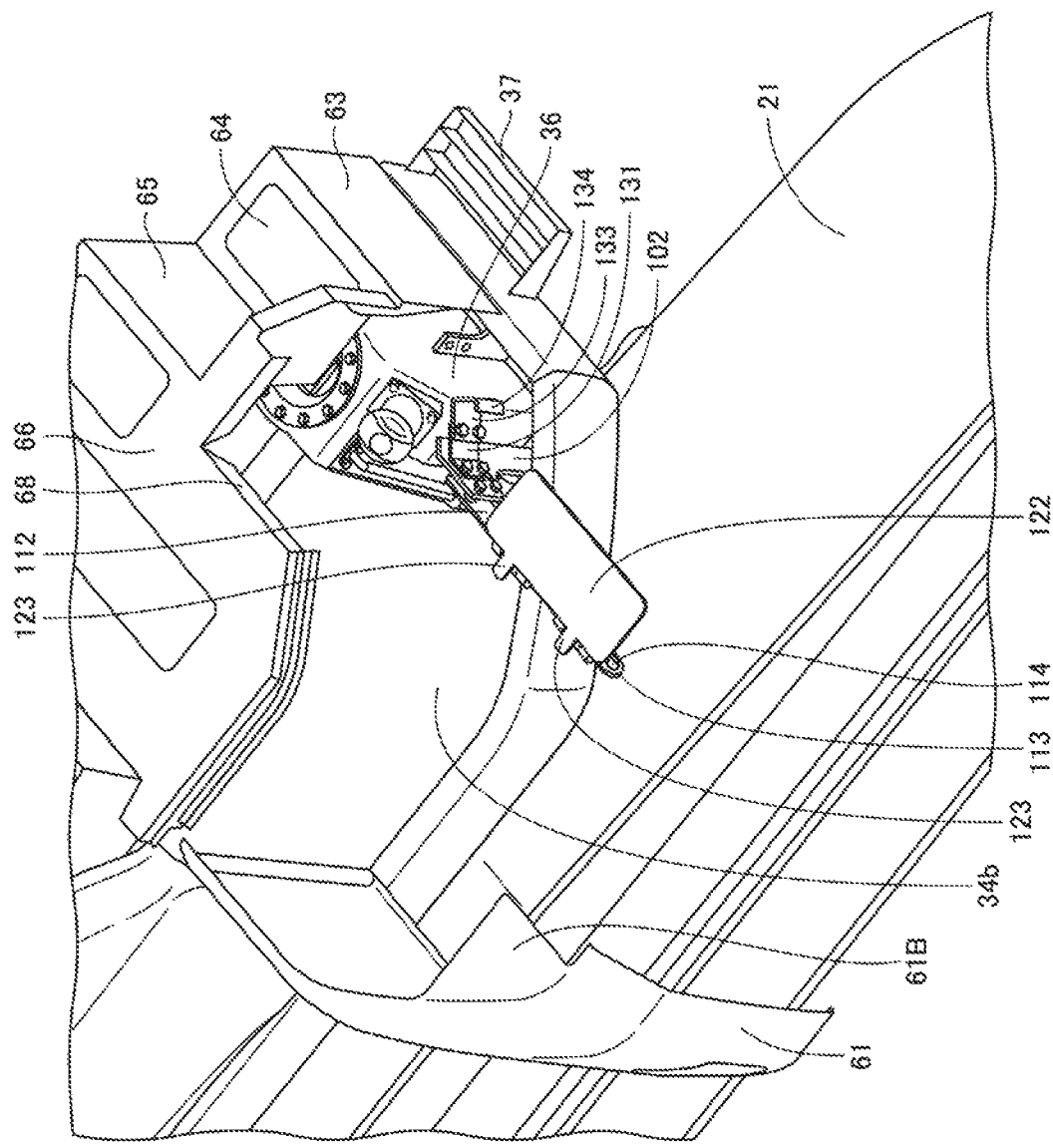
FIG. 9 is a perspective view showing a state that a movable base portion of the support base has been developed.
Figure 10:
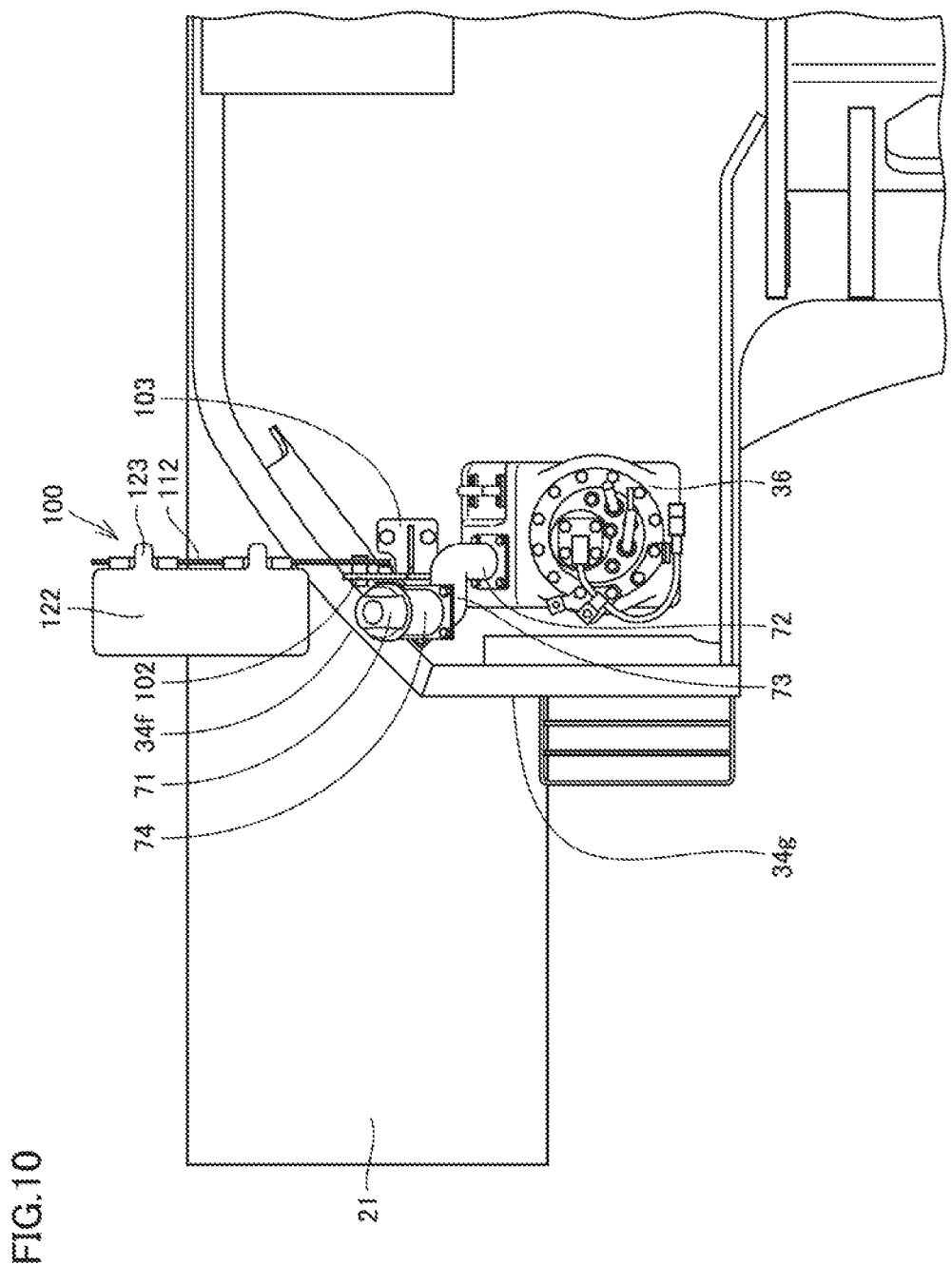
FIG. 10 is a plan view showing a state that the movable base portion of the support base has been developed.
Figure 11:
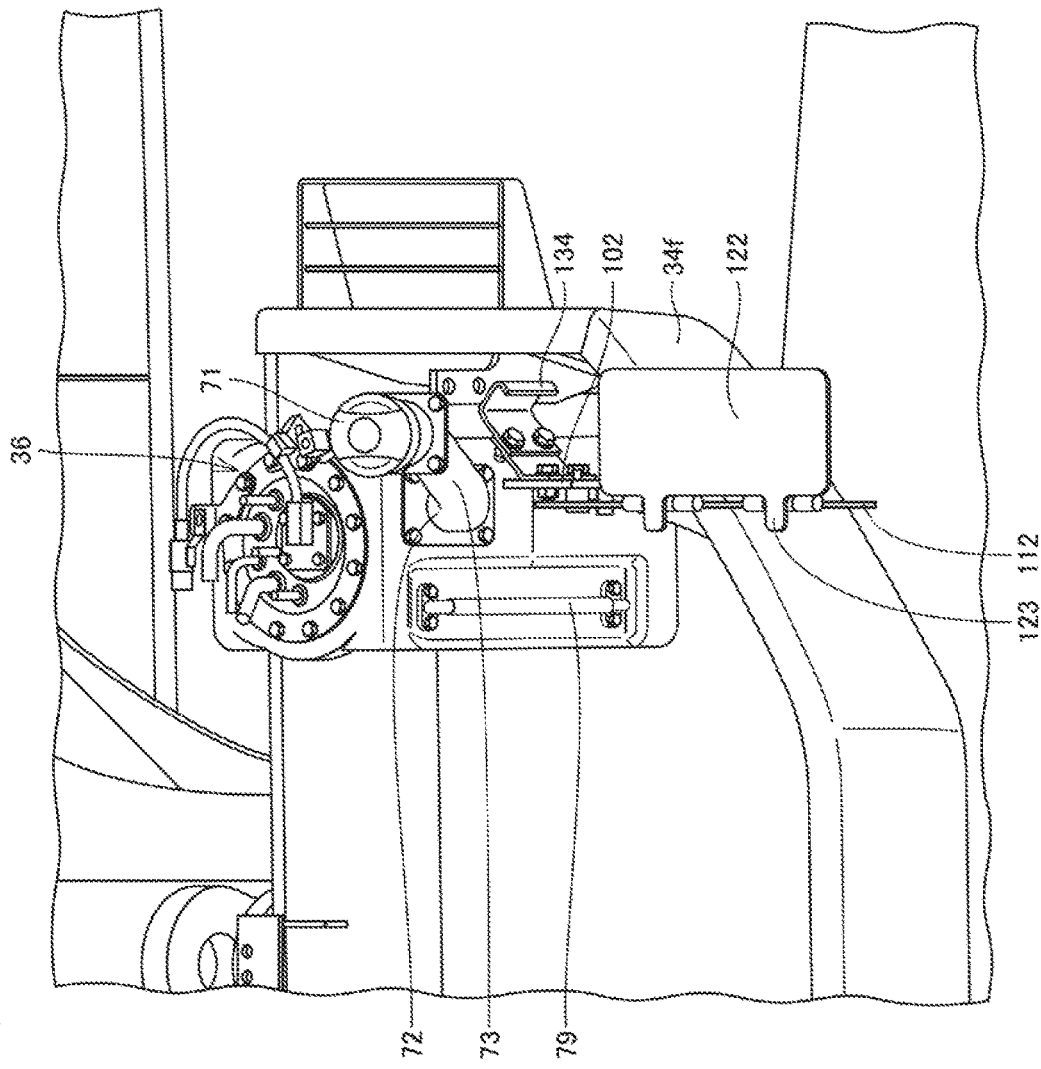
FIG. 11 is a perspective view from a different angle, of the state that the movable base portion of the support base has been developed.

FIG. 9 is a perspective view showing a state that movable base portion 121 of support base 100 has been developed. FIG. 10 is a plan view showing a state that movable base portion 121 of support base 100 has been developed. FIG. 11 is a perspective view from a different angle, of the state that movable base portion 121 of support base 100 has been developed. Support base 100 shown in FIGS. 9 to 11 is in the developed position described with reference to FIG. 6. A position of support base 100 can be changed between the developed position and the stored position.

As shown particularly clearly in FIG. 10, support base 100 in the developed position protrudes to the outside of revolving frame 34 in a plan view. When support base 100 is in the developed position, a part of movable base portion 121 protrudes forward from a front edge of reducing agent tank 36. Feed pipe 75 is interposed between tank main body 70 of reducing agent tank 36 and movable base portion 121 of support base 100 in the developed position, in the lateral direction. As described above, feed pipe 75 protrudes to the right from tank main body 70. Movable base portion 121 of support base 100 in the developed position is arranged on the right of feed pipe 75, at a greater distance from tank main body 70 than from feed pipe 75 in a plan view.

Though revolving unit 30 is provided revolvably with respect to travel unit 20, in the arrangement shown in FIGS. 9 to 11, the fore/aft and lateral directions of revolving unit 30 and the fore/aft and lateral directions of hydraulic excavator 50 match with each other. In the arrangement shown in FIGS. 9 to 11, the fore/aft direction of revolving frame 34 and a direction of travel of hydraulic excavator 50 by travel unit 20 match with each other. In the arrangement shown in FIGS. 9 to 11, the pair of crawler belts 21 is arranged in opposing end portions in the direction of the vehicle width of revolving frame 34. In the arrangement shown in FIGS. 9 to 11, crawler belt 21 extends in the fore/aft direction of revolving frame 34 along a side edge of revolving frame 34.

In this arrangement, a part of support base 100 in the developed position is superimposed on crawler belt 21 in a plan view and arranged above crawler belt 21. Support base 100 in the developed position protrudes to the outside of revolving frame 34 in the direction of the vehicle width of revolving frame 34 (a direction shown in FIG. 10, in which front end 34g of revolving frame 34 extends). The entire support base 100 in the developed position is arranged in the rear of front end 34g of revolving frame 34. A part of support base 100 in the developed position protrudes to the right of a right side edge portion of revolving frame 34. A part of support base 100 in the developed position is arranged as extending off from an outer edge portion of crawler belt 21.

Figure 12:
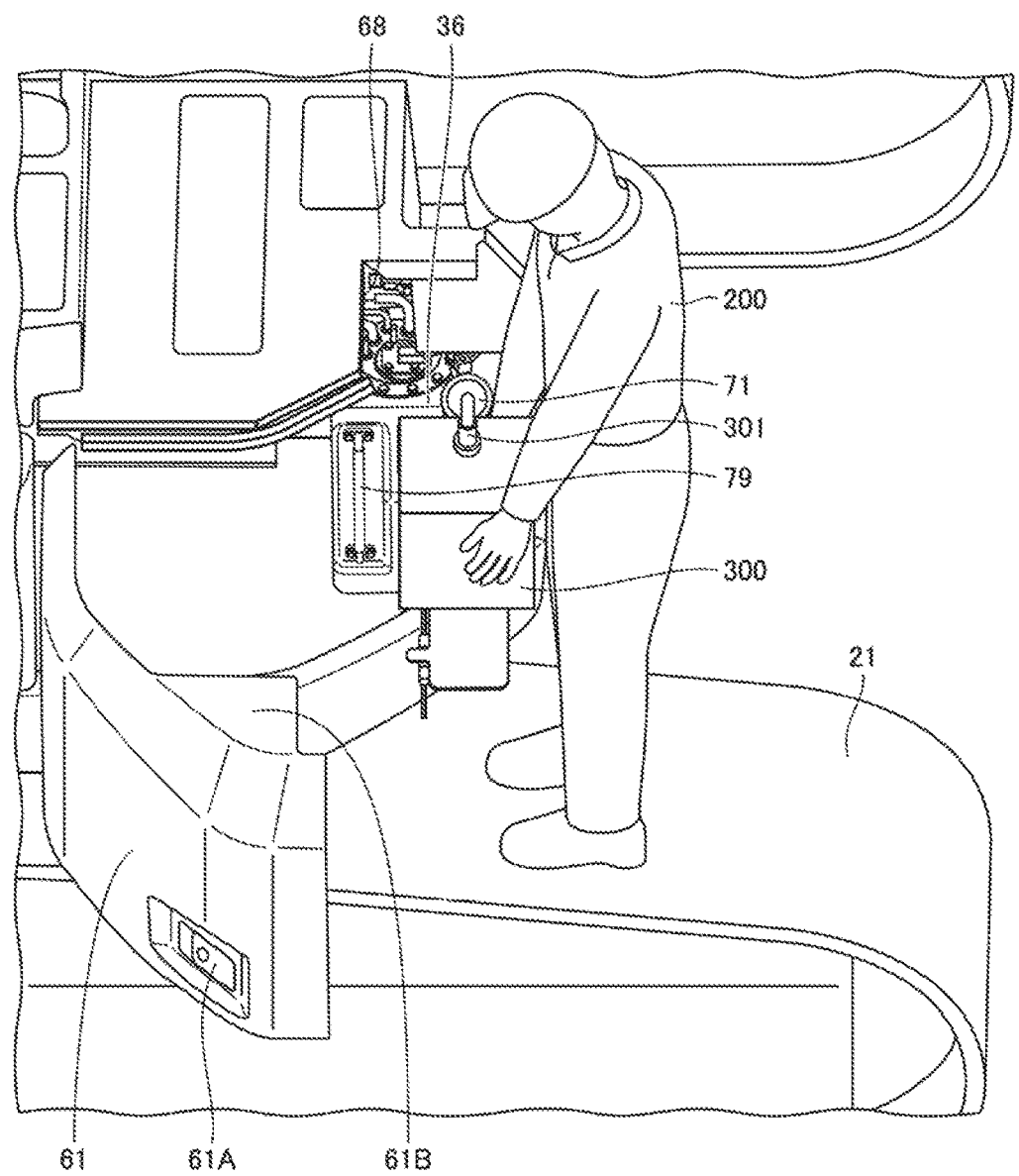
FIG. 12 is a schematic diagram showing an operation for replenishing the reducing agent tank with a reducing agent.

FIG. 12 is a schematic diagram showing an operation for replenishing reducing agent tank 36 with the reducing agent. Exterior cover 61 shown in FIG. 12 is opened. Support base 100 is in the developed position and movable arm portion 111 and movable base portion 121 protrude to the outside of revolving frame 34.

A worker 200 replenishes reducing agent tank 40 with the reducing agent by holding with his/her hands, a container 300 accommodating the reducing agent for replenishment and allowing the reducing agent to flow into reducing agent tank 40. Container 300 may be such a bag-in-box that a vessel made of polyethylene is further covered with a corrugated cardplate.

During the operation for replenishment with the reducing agent, support base 100 is held in the developed position. Container 300 is placed on support base portion 122 in a shape of a flat plate of support base 100 in the developed position. Worker 200 places container 300 on support base 100, removes cap 71c from feed port 71 of feed pipe 75 while container 300 is supported on support base 100, and inserts a nozzle 301 into feed port 71 from which cap 71c has been removed. Then, the worker performs the operation for replenishment of reducing agent tank 36 with the reducing agent by slantly tilting container 300.

Support base 100 in the developed position protrudes to the right, to the outside of revolving frame 34 and is superimposed on crawler belt 21. Therefore, as shown in FIG. 12, while worker 200 stands on crawler belt 21, the operation for replenishment of reducing agent tank 36 with the reducing agent can be performed.

Figure 13:
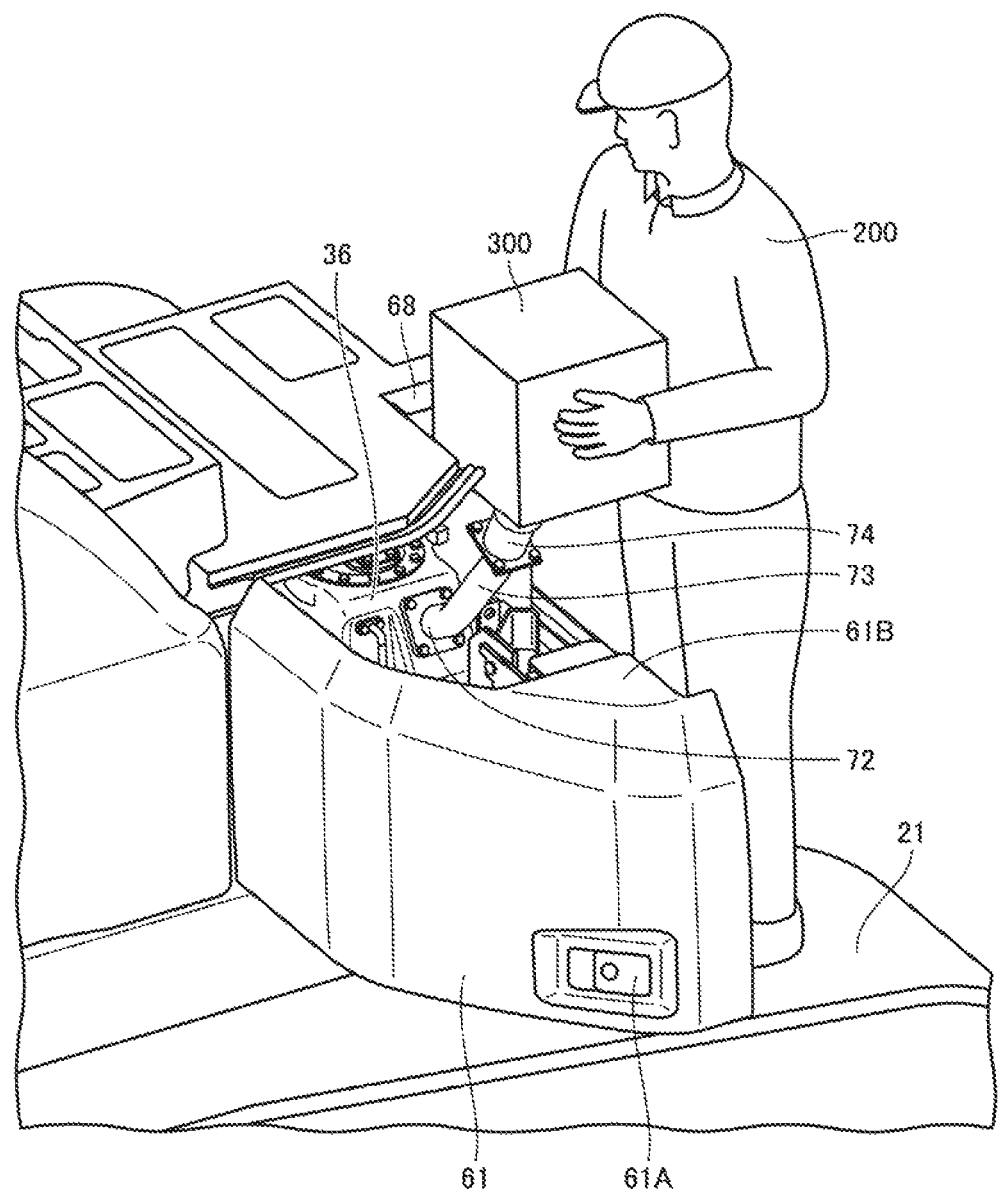
FIG. 13 is a schematic diagram showing a state that an amount of the reducing agent in a container is small during the operation for replenishment of the reducing agent tank with the reducing agent.

FIG. 13 is a schematic diagram showing a state that an amount of the reducing agent in container 300 is small during the operation for replenishment of reducing agent tank 36 with the reducing agent. As an amount of the reducing agent in container 300 decreases, worker 200 performs the replenishment operation while he/she lifts container 300 from support base 100 and holds container 300 with his/her hands. Worker 200 can empty container 300 by inverting container 300 such that nozzle 301 is located below with respect to a main body of container 300 and the reducing agent flows down to nozzle 301.

Ceiling portion 61B serving as a cover above feed pipe 75 of reducing agent tank 36 is provided integrally with exterior cover 61, and ceiling portion 61B also moves with opening and closing of exterior cover 61. By opening exterior cover 61, ceiling portion 61B moves to a position where it is not superimposed on feed pipe 75 in a plan view. By moving ceiling portion 61B relative to reducing agent tank 36 to thereby open the space above feed pipe 75, interference between inverted container 300 and the front cover of hydraulic excavator 50 is avoided as shown in FIG. 13.

A function and effect of the present embodiment will now be described.

Hydraulic excavator 50 representing one example of the work vehicle in the present embodiment includes reducing agent tank 36 as shown in FIGS. 2 and 3. Reducing agent tank 36 has tank main body 70 which stores the reducing agent to be supplied to exhaust gas treatment device 1 and feed pipe 75 which protrudes from tank main body 70. Feed pipe 75 protrudes from tank main body 70 to the right of revolving frame 34. Hydraulic excavator 50 includes support base 100. Support base 100 is formed as a component separate from exterior cover 61 which laterally covers revolving frame 34 as shown in FIG. 9. Support base 100 supports container 300 which is a vessel for a reducing agent with which reducing agent tank 36 is replenished, as shown in FIG. 12.

As shown in FIGS. 5 to 11, a position of support base 100 can be changed between the developed position and the stored position. As shown in FIG. 7, feed pipe 75 protrudes to the right from tank main body 70 in the plan view. Support base 100 in the developed position is arranged on the right at a greater distance from tank main body 70 than from feed pipe 75. As shown in FIGS. 5 and 7, support base 100 in the stored position is confined in exterior cover 61.

By providing support base 100, during an operation for replenishment of reducing agent tank 36 with the reducing agent, container 300 containing the reducing agent for replenishment can be placed on support base 100. In performing a prior operation for removing cap 71c from feed port 71 and inserting nozzle 301 into feed port 71, it is not necessary for worker 200 to perform the prior operation while he/she holds container 300. Therefore, operability in the operation for replenishment with the reducing agent can be improved and reducing agent tank 36 can readily be replenished with the reducing agent.

Since support base 100 is constructed such that a position thereof can be changed between the developed position and the stored position, support base 100 can be stored in exterior cover 61 when the operation for replenishment with the reducing agent is not performed. Therefore, a space necessary for setting support base 100 can be saved.

Feed pipe 75 protrudes from tank main body 70 in the direction of the vehicle width (the lateral direction) of revolving frame 34. In the present embodiment, feed pipe 75 protrudes to the right from tank main body 70. When reducing agent tank 36 is viewed from the right, support base 100 in the stored position is arranged on the left of feed pipe 75. Support base 100 in the stored position is arranged on a rear side of revolving frame 34, with respect to feed pipe 75. By thus arranging support base 100 in the stored position, a space for storing support base 100 can be secured even in a small work vehicle such as a hydraulic excavator of a short tail swing type.

As shown in FIG. 1, hydraulic excavator 50 further includes travel unit 20. As shown in FIG. 2, travel unit 20 has a pair of crawler belts 21 and supports revolving frame 34. As shown in FIG. 10, support base 100 in the developed position is superimposed on crawler belt 21 in the plan view'. By thus arranging support base 100 in the developed position, worker 200 can perform the operation for replenishment with the reducing agent with crawler belt 21 serving as a foothold, and therefore operability in the operation for replenishment with the reducing agent can further be improved.

As shown in FIG. 10, while revolving frame 34 is arranged at a position where the fore/aft direction of revolving frame 34 and the direction of travel of travel unit 20 match with each other, support base 100 in the developed position is superimposed on crawler belt 21 in the plan view. By arranging support base 100 in the developed position as being superimposed on crawler belt 21 in the arrangement in which crawler belt 21 extends in the fore/aft direction of revolving frame 34, worker 200 can perform the operation for replenishment with the reducing agent with crawler belt 21 serving as a foothold, and therefore operability in the operation for replenishment with the reducing agent can further be improved.

As shown in FIG. 10, support base 100 in the developed position protrudes to the outside of revolving frame 34 in the direction of the vehicle width (the lateral direction) of revolving frame 34. In the present embodiment, support base 100 in the developed position protrudes to the right, to the outside of revolving frame 34. In a case of a small work vehicle such as a hydraulic excavator of a short tail swing type, a space made use of as a foothold on crawler belt 21 is small. When support base 100 is constructed to protrude forward from revolving frame 34 in this case, a foothold for worker 200 to perform the operation for replenishment with the reducing agent is narrow and operability lowers. By providing support base 100 so as to protrude in the direction of the vehicle width of revolving frame 34 as in the present embodiment, worker 200 can perform the operation for replenishment with the reducing agent with crawler belt 21 serving as a foothold, and therefore operability in the operation for replenishment with the reducing agent can further be improved.

As shown in FIGS. 2 and 10, reducing agent tank 36 is mounted on the front end portion of revolving frame 34. The front right corner portion of revolving frame 34 has the curved shape. Hydraulic excavator 50 in the present embodiment is of a short tail swing type and has curved portion 34f formed in the front right corner portion of revolving frame 34 in order to make a stewing radius smaller. By applying support base 100 in the present embodiment to such a small work vehicle, operability in the operation for replenishment with the reducing agent can be improved.

When reducing agent tank 36 is viewed in the direction of protrusion of feed pipe 75 from tank main body 70 as shown in FIG. 3, support base 100 in the stored position is located laterally to feed pipe 75 as shown in FIGS. 5 and 7. By arranging support base 100 in the stored position laterally to feed pipe 75, a space for storing support base 100 can be secured also in a small work vehicle such as a hydraulic excavator of a short tail swing type.

As shown in FIG. 3, feed pipe 75 has base end portion 72 coupled to tank main body 70 and tip end portion 74. Feed port 71 is formed at the tip end portion of tip end portion 74. When reducing agent tank 36 is viewed in the direction of protrusion of feed pipe 75 from tank main body 70 as shown in FIG. 3, feed port 71 is arranged on the right of base end portion 72. As shown in FIGS. 5 and 7, when reducing agent tank 36 is viewed in the direction of protrusion of feed pipe 75 from tank main body 70, support base 100 in the stored position is arranged on the left of feed pipe 75. Feed pipe 75 has a bent shape in a direction toward a side opposite to a side where support base 100 is arranged with respect to feed pipe 75.

By doing so, a space for storing support base 100 can reliably be secured laterally to feed pipe 75. With such a construction that feed pipe 75 is in a bent shape and feed port 71 is closer to an edge portion of revolving frame 34 as in the present embodiment, a wider space for the operation for replenishment with the reducing agent can be secured and operability in the operation for replenishment with the reducing agent can further be improved.

As shown in FIG. 3, hydraulic excavator 50 further includes level gauge 79 for checking an amount of the reducing agent stored in tank main body 70. When reducing agent tank 36 is viewed in the direction of protrusion of feed pipe 75 from tank main body 70 as shown in FIG. 3, level gauge 79 is arranged on the left of feed pipe 75. As shown in FIGS. 5 and 7, when reducing agent tank 36 is viewed in the direction of protrusion of feed pipe 75 from tank main body 70, support base 100 in the stored position is arranged on the left of feed pipe 75. Level gauge 79 is arranged on the side where support base 100 is arranged with respect to feed pipe 75.

Feed pipe 75 is bent toward the side opposite to the side where support base 100 is arranged with respect to feed pipe 75, and level gauge 79 is arranged, with respect to feed pipe 75, in an orientation opposite to the direction in which feed pipe 75 is bent. By doing so, level gauge 79 can more readily be viewed. Therefore, worker 200 who is performing the operation for replenishment with the reducing agent can readily check an amount of the reducing agent in tank main body 70 with the use of level gauge 79.

As shown in FIG. 4, hydraulic excavator 50 further includes ceiling portion 61B which serves as a cover above feed pipe 75 of reducing agent tank 36. Ceiling portion 61B is provided integrally with exterior cover 61 forming a part of the side surface of the vehicular body as shown in FIGS. 4 and 5. Exterior cover 61 is constructed to be opened and closed. As shown in FIGS. 5 and 7, ceiling portion 61B moves to a position where it is not superimposed on feed pipe 75 in the plan view, by opening exterior cover 61.

By doing so, by opening and closing exterior cover 61, ceiling portion 61B can readily be moved to a first position where it covers feed pipe 75 of reducing agent tank 36 from above and a second position where it opens a space above feed pipe 75. By moving ceiling portion 61B to the second position where it is not superimposed on feed pipe 75 during the operation for replenishment of reducing agent tank 36 with the reducing agent, as shown in FIG. 13, interference between the front cover of hydraulic excavator 50 forming the tank room for accommodating reducing agent tank 36 and container 300 which is a vessel for the reducing agent can be avoided. Therefore, operability in the operation for replenishment with the reducing agent while an amount of the reducing agent in container 300 is small can further be improved. Since the space above feed pipe 75 is opened, worker 200 during the operation for replenishment with the reducing agent readily views level gauge 79.

Though description has been given in the embodiment above for a minimal swing radius hydraulic excavator, the present embodiment is applicable to hydraulic excavators in general. In addition, the present embodiment is applicable also to any work vehicle other than the hydraulic excavator.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 exhaust gas treatment device; 10 exhaust gas treatment unit; 20 travel unit; 21 crawler belt; 30 revolving unit; 34 revolving frame; 34b bottom plate; 34e outer peripheral edge; 34f curved portion; 35 engine; 36 reducing agent tank; 40 work implement; 50 hydraulic excavator; 61 exterior cover; 61A handgrip; 61B ceiling portion; 70 tank main body; 71 feed port; 71c cap; 72 base end portion; 73 intermediate portion; 74 tip end portion; 75 feed pipe; 79 level gauge; 80 lid; 100 support base; 101 support post portion; 102 post portion; 103 fixing portion; 104 rib portion; 105, 132 bolt; 106 nut; 107 stopper; 111 movable arm portion; 112 arm portion; 113 distal end; 114 finger hole; 115 pivot shaft portion; 116, 117 engagement portion; 118 placement portion; 119 arc edge portion; 121 movable base portion; 122 support base portion; 123 engagement protrusion; 124 hinge shaft; 125 first hinge plate; 126 second hinge plate; 200 worker; 300 container; and 301 nozzle.

The invention claimed is:

1. A work vehicle, comprising:
an engine;
a vehicular body frame on which the engine is mounted;
an exterior cover which covers the vehicular body frame;
an exhaust gas treatment device which treats an exhaust gas from the engine through reduction reaction;
a reducing agent tank which has a tank main body storing a reducing agent to be supplied to the exhaust gas treatment device and a feed pipe protruding from the tank main body for replenishment of the tank main body with a reducing agent; and
a support base which is constructed as a component separate from the exterior cover and supports a vessel for the reducing agent for replenishment of the reducing agent tank, the support base having a support post portion fixed to the vehicular body frame, a movable arm portion pivotable with respect to the support post portion, and a movable base portion pivotable with respect to the movable arm portion, the support base being variable in position between a developed position in which the support base is arranged at a greater distance from the tank main body than from the feed pipe in a direction of protrusion of the feed pipe from the tank main body in a plan view and a stored position in which the support base is confined in the exterior cover.

2. The work vehicle according to claim 1, wherein the feed pipe protrudes from the tank main body in a direction of a vehicle width of the vehicular body frame.

3. The work vehicle according to claim 1, further comprising a travel unit which has a pair of crawler belts and supports the vehicular body frame, wherein
the support base in the developed position is superimposed on the crawler belt in a plan view.

4. The work vehicle according to claim 3, wherein
the support base in the developed position is superimposed on the crawler belt in the plan view while the vehicular body frame is arranged at a position where a fore/aft direction of the vehicular body frame and a direction of travel of the travel unit match with each other.

5. The work vehicle according to claim 1, wherein
the support base in the developed position protrudes to outside of the vehicular body frame in a direction of a vehicle width of the vehicular body frame.

6. The work vehicle according to claim 1, wherein
the reducing agent tank is mounted on a front end portion of the vehicular body frame, and
a front corner portion of the vehicular body frame has a curved shape.

7. The work vehicle according to claim 1, wherein
the support base in the stored position is located laterally to the feed pipe when the reducing agent tank is viewed in the direction of protrusion of the feed pipe from the tank main body.

8. The work vehicle according to claim 7, wherein
the feed pipe has a base end portion coupled to the tank main body and a feed port, and
the feed port is arranged, with respect to the base end portion, opposite to a side where the support base in the stored position is located with respect to the feed pipe when the reducing agent tank is viewed in the direction of protrusion of the feed pipe from the tank main body.

9. The work vehicle according to claim 7, further comprising a level gauge for checking an amount of the reducing agent stored in the tank main body, wherein
the level gauge is arranged, with respect to the feed pipe, on a side where the support base in the stored position is located with respect to the feed pipe when the reducing agent tank is viewed in the direction of protrusion of the feed pipe from the tank main body.

10. The work vehicle according to claim 1, further comprising a ceiling portion which is provided integrally with the exterior cover and serves as a cover above the feed pipe, wherein
the ceiling portion moves to a position where the ceiling portion is not superimposed on the feed pipe in a plan view, by opening of the exterior cover.

* * * * *